March 28, 1967 L. R. BOYD 3,311,770
GAMMA COMPENSATED NEUTRON ION CHAMBER
Filed May 13, 1963 2 Sheets-Sheet 1
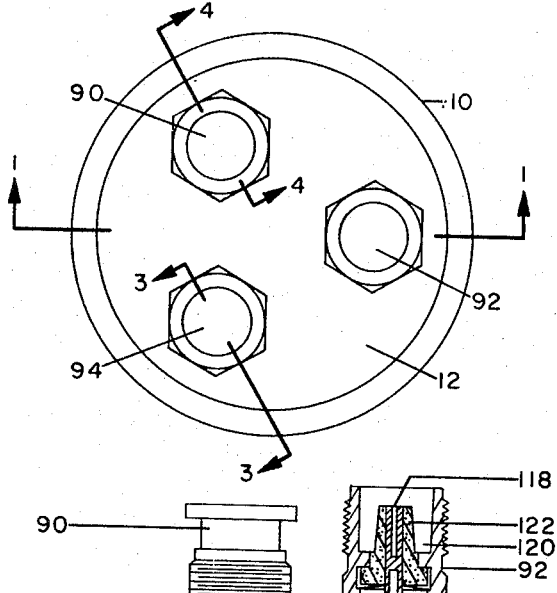
FIGURE 2
FIGURE 3
FIGURE 4
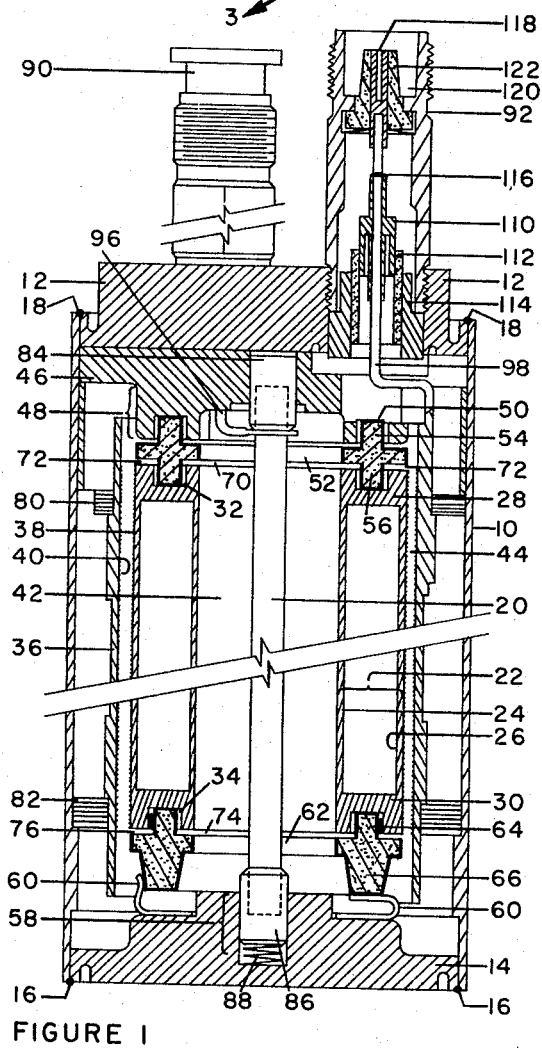
FIGURE 1
INVENTOR.
LEO R. BOYD
BY
ATTORNEY.

March 28, 1967    L. R. BOYD    3,311,770
GAMMA COMPENSATED NEUTRON ION CHAMBER
Filed May 13, 1963    2 Sheets-Sheet 2

INVENTOR.
LEO R. BOYD
BY
ATTORNEY

United States Patent Office 3,311,770
Patented Mar. 28, 1967

3,311,770
GAMMA COMPENSATED NEUTRON ION
CHAMBER
Leo R. Boyd, San Jose, Calif., assignor to General Electric Company, a corporation of New York
Filed May 13, 1963, Ser. No. 279,928
5 Claims. (Cl. 313—61)

This invention relates to radiation sensors, particularly an improved gamma compensated neutron ion chamber for measuring neutron radiation levels accurately in spite of simultaneous gamma radiation in excess of $10^4$ r./hr.

Ion chambers are widely used to detect and to measure alpha, gamma, and neutron radiation. The chamber is essentially an enclosure having two electrodes spaced apart from one another and filled with a readily ionizable medium such as a gas. A potential gradient is established between the electrodes by applying moderately high (500–1000 v.) direct current voltages. Incident radiation penetrates the enclosure as well as the electrodes. Such radiation interacts directly or through intermediate nuclear reactions with the gas atoms forming ion pairs. At least part of these pairs are collected by the electrodes creating a current flow between them and in the external circuit. Essentially all of the ion pairs may be collected if sufficiently high voltages are applied. Such ion chambers perform well for measurement of alpha and gamma radiation.

Neutron radiation, however, is not so readily measured because neutrons are uncharged particles having gas ionizing properties substantially different from alpha and gamma radiation. Although fast neutrons readily ionize gases, it is frequently essential to measure accurately slow or thermal neutron radiation which does not readily ionize them. The neutron ion chambers of the prior art were provided with a neutron sensitive material, which on absorption of a neutron, produces ionizing radiation within the chamber. Such materials may involve neutron-atom interactions of the n-alpha or n-fission types. Suitable materials include the elemental or compound forms of such elements as boron, lithium, uranium, plutonium, and the like. They may be the natural mixture of isotopes, or they may be artificially enriched in particular isotopes such as $B^{10}$, $U^{235}$, etc. These materials upon neutron irradiation eject high energy charged particles which ionize the gas within the chamber. This produces a signal current proportional to neutron radiation intensity.

Neutron fluxes however are very often associated with strong gamma fields, such as exist in the operation of a nuclear reactor where a neutron induced chain fission reaction involving uranium, thorium, or plutonium is maintained. The ordinary prior art neutron ion chamber described above is also sensitive to the incident gamma component of the radiation field and the signal produced is more or less proportional to the sum of the gamma and neutron radiation intensities. Thus an erroneous indication for neutron radiation intensity is obtained.

To overcome this problem the compensated neutron ion chambers of the prior art were developed. These consist of an enclosure surrounding a pair of spaced high voltage electrodes with a signal or collector electrode placed between them, thus forming two volumes containing the ionizable medium. The signal electrode, or collector, is common to both volumes. The neutron sensitive material is placed in one of these volumes. Potentials of opposite polarity are applied to the respective high voltage electrodes, and the signal electrode is connected through a signal lead to an amplifier for example. The signal currents created by gamma radiation ionization in the two chamber volumes thus oppose and cancel one another in the signal lead. The net signal produced is that created by the neutron radiation in spite of the gamma field which otherwise interferes. The chamber is said to be "compensated."

It has been found in applications and tests of these prior art gamma compensated neutron ion chambers that the signal produced quite accurately reflects the neutron radiation intensity, except where unusually high gamma fields are present. When gamma radiation levels rise above about $10^3$ r./hr. the compensation fails and the output signal can be in error by as much as 25% of the gamma signal from the neutron sensitive volumes.

The present invention therefore is directed at overcoming this problem and provides an improved gamma compensated neutron ion chamber which retains its compensation, that is, its gamma radiation insensitivity, even in situations where the gamma radiation exceeds by a thousand times or more the prior art limit of about $10^3$ r./hr.

It is therefore an object of this invention to provide an improved gamma compensated neutron ion chamber.

It is an additional object of the invention to provide a gamma compensated neutron ion chamber in which the degree of compensation is independent of the gamma field intensity.

It is another object of this invention to provide a neutron ion chamber having a particular structure so as to eliminate substantially the net gamma radiation sensitivity.

It is also an object to provide a gamma compensated neutron ion chamber, the compensation of which is independent of the choice of high voltage polarity applied to the high voltage electrodes of the chamber.

Other objects and advantages of the present invention will become apparent to those skilled in this particular art as the description and illustration of the invention proceed.

Briefly, the gamma compensated neutron ion chamber of this invention includes an inner electrode, a signal electrode surrounding said inner electrode, and an outer electrode surrounding said signal electrode. A sealed case encloses the electrodes. The electrodes are coaxially spaced apart from one another. A first conductive guard ring structure is disposed within said case at one end. This includes a first inwardly projecting boss, and a first signal electrode insulator which projects into supporting contact with the first boss and with one end of the signal electrode. A second conductive guard ring structure is located within the sealed case at the other end. This structure includes a second inwardly projecting annular boss, and a second signal electrode insulator which projects into supporting contact with the second boss and with the other end of the signal electrode. The corresponding inner and outer dimensions and the thicknesses of both bosses, both signal electrode insulators, and the signal electrode are substantially the same. An ionizable gas fills all open volumes within the case. A neutron sensitive material is disposed between the signal and the outer electrodes and is capable of producing ionizing radiation upon neutron irradiation. Terminal means are secured to and insulated from the case and are connected to the individual electrodes.

The present invention will be more readily understood by reference to the accompanying drawings forming a part of this specification and in which:

FIGURE 1 is a longitudinal cross section view of a gamma compensated neutron ion chamber embodying the present invention, and showing a cross section view of one of the chamber terminals;

FIGURE 2 is a view of the terminal end of the ion chamber shown in FIGURE 1;

FIGURE 3 is a detailed cross section view of another of the chamber terminals shown in FIGURES 1 and 2;

FIGURE 4 is a detailed cross section view of the third chamber terminal shown in FIGURES 1 and 2;

Figure 5:
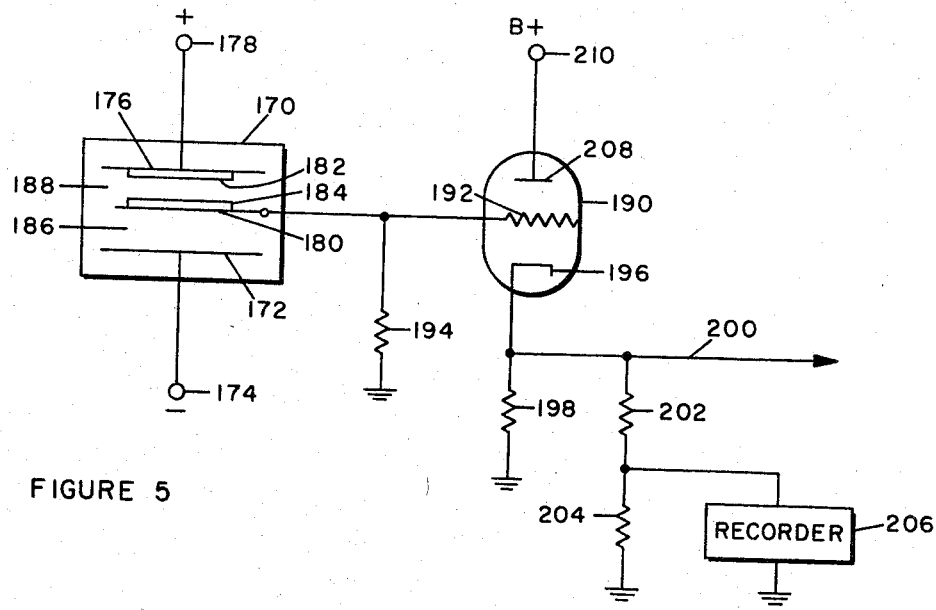
FIGURE 5 is a simplified circuit diagram of an instrument with which the gamma compensated neutron ion chamber of this invention may be used.

Referring now particularly to FIGURE 1, one embodiment of the improved gamma compensated ion chamber according to this invention includes a cylindrical case 10 closed at its ends with end members 12 and 14. The enclosure thus formed is sealed by means of peripheral welds 16 and 18 forming a gas tight enclosure. Disposed along the longitudinal axis of case 10 is inner high voltage electrode 20. Coaxially surrounding inner electrode 20 is signal electrode 22. This signal electrode is made up of inner tubular member 24 and outer tubular member 26 secured to one another in coaxial relationship at their ends by means of first end ring 28 and second end ring 30. The end surfaces of each of these end rings are provided with annular grooves 32 and 34, respectively. Coaxially surrounding signal electrode 22 is outer high voltage electrode 36. Disposed on the inner surface of outer electrode 36 and on the outer surface of signal electrode 22 are layers 38 and 40 of the neutron sensitive material, such as natural boron containing 19.6% $B^{10}$ and 80.4% $B^{11}$, or artificially enriched boron containing in excess of 96% $B^{10}$ and the balance $B^{11}$.

The gamma sensitive volume of this ion chamber is the annular space 42 located between inner high voltage electrode 20 and signal electrode 22. The neutron sensitive volume is annular space 44 disposed between signal electrode 22 and outer high voltage electrode 36. Space 44 is also sensitive to gamma radiation. The gamma and neutron sensitive spaces 42 and 44 are connected in series opposition as indicated subsequently in FIGURE 5 so that the net signal output is proportional only to the neutron radiation intensity.

Although in the prior art gamma compensated neutron ion chambers, the inner high voltage electrode corresponding to inner electrode 20 is normally negative and the outer high voltage electrode corresponding to outer electrode 36 is normally positive, due to gross variations in compensation with polarity, the chamber of this invention may be operated equally well in the opposite mode of polarity.

Located adjacent first end member 12 is retaining plate 46 which is in electrical contact with end member 12 and case 10. Retaining plate 46 is provided with an inwardly projecting annular boss 48, in the inner surface of which is provided an annular groove or slot 50 disposed directly opposite the corresponding groove 32 in first end ring 28 of the signal electrode. Disposed immediately between boss 48 and first end ring 28 is first circular insulator 52. This insulator is provided on its opposite sides with first and second annular projections 54 and 56 which project into supporting contact with the annular boss and the signal electrode by means of grooves 50 and 32, respectively. In this way the upper end (as FIGURE 1 is normally viewed) of signal electrode 22 is supported by and insulated from first annular boss 48.

Second end member 14 is provided with a double coaxial second annular boss 58 and support and centering spring means 60. A second circular insulator 62 is provided with first and second annular projections 64 and 66. Projection 64 extends into annular groove 34 of second end ring 30. Lower projection 66 rests on and within the alternate support and centering leaves of spring means 60. Thus second circular insulator 62 projects into supporting contact with the second annular boss and the other end of signal electrode 22.

First and second circular insulators 52 and 62 are fabricated from a high quality, radiation resistant, high voltage insulating material such as fused alumina, fosterite, or the like. The inner and outer diameters and the radial thickness of these first and second circular insulators are substantially identical to the corresponding dimensions of both first annular boss 48 and signal electrode 22. Furthermore, all surfaces of first circular insulator 52 with the exception of the two annular surfaces on either side of second projection 56, that is, the insulator surfaces which are immediately opposite the outer end surfaces of first end ring 28, are provided with a conductive coating. This coating establishes good electrical contact between the adjacent parts of first circular insulator 52 and first annular projection 48, as well as establishing good electrical contact between the adjacent parts of insulator 52 and first end ring 28. Very small gaps 70 and 72 are thus provided on both sides of second projection 56 between first circular insulator 52 and first end ring 28.

Similarly, all surfaces of second circular insulator 62, except the two annular surfaces on either side of first projection 64 and which are immediately opposite the two annular surfaces at the end of second end ring 30, are provided with such conductive coatings. This leaves only very narrow gaps 74 and 76 between end ring 30 and second circular insulator 62.

Gaps 70, 72, 74, and 76 necessarily contain a minute volume of ionizable gas. This minute volume however does not contribute in any material way to the output signal of the chamber because (a) first and second circular insulators 52 and 62 substantially completely displace the volume between first annular boss 48 and first end ring 28 on the one hand, and the volume between second end ring 30 and second annular boss 58 on the other, and (b) the inner and outer diameters and radial thicknesses of first annular boss 48, first and second circular insulators 52 and 62, and the outer tubular member of signal electrode 22 are all substantially identical. A substantially unbroken outer conducting surface is thus presented to outer electrode 36. A substantially smooth unbroken inner conducting surface is also presented to inner high voltage electrode 20. Thus no extraneous volumes containing ionizable gas exist and practically completely uniform electrostatic fields exist at the ends of signal electrode 22. The result of this structural arrangement has been found to provide nearly perfect compensation in very strong gamma radiation fields even up to intensities of $10^6$ r./hr. and more, and provide a complete elimination of high voltage electrode polarity effects.

Outer high voltage electrode 36 coaxially surrounds signal electrode 22. It is supported in this position and insulated from signal electrode 22 and case 10 by means of first and second ring insulators 80 and 82. These insulators cooperate with the shoulders shown formed in the inner surface of case 10 and the outer surface of outer high voltage electrode 36.

The inner high voltage electrode 20 is provided with first and second end insulators 84 and 86, which in turn are received in central openings in retaining plate 46 and second end member 14, respectively. Loading spring 88 is provided in the central opening in second end member 14 to fix inner high voltage electrode 20 in position.

First end member 12 is provided with three terminals 90, 92, and 94. The latter terminal 94 is not shown in FIGURE 1 due to the nature of the cross sectional view, but it appears clearly in FIGURE 2. Terminal 90 contains lead 96 connected to inner high voltage electrode 20. Terminal 92 contains lead 98 connected to outer high voltage electrode 36. Terminal 94 contains lead 100 connected to signal electrode 22 in a manner not shown in FIGURE 1 but which appears more clearly in FIGURE 3.

The open volumes of this device are filled with a readily ionizable medium such as any relatively non-reactive, non-corrosive, electropositive gas at a normal pressure of about one atmosphere. Following fabrication of the device, the air is evacuated through a conduit 102 shown in FIGURE 3 in terminal 94 and the device is backfilled with chemically pure anhydrous nitrogen gas, for example. Conduit 102 is then sealed at 104 shown in FIGURE 3.

Typically the inner and outer surfaces defining neutron sensitive volume 36, which are the outer and inner surfaces respectively of signal electrode 22 and outer high voltage electrode 32, are provided with a coating consisting of natural boron, for example. This coating is applied by pyrodecomposition of diborane. The neutron sensitivity derives from the $B^{10}(n,\alpha)Li^7$ reaction in which neutron capture by a $B^{10}$ atom releases an energetic $\alpha$ particle which ionizes the nitrogen gas filling the space in volume 44. Alternatively, enriched boron (over 96% $B^{10}$) may be used. With layers of natural or enriched uranium, or plutonium substituted, neutron sensitivity derives from fission reactions, namely $U^{235}(n,f)F.P.$ and $Pu^{239}(n,f)F.P.$, in which energetic charged fission products (F.P.) effect the gas ionization.

In the present invention, the gas filled volume of gamma sensitive space 42 is substantially equal to the volume of neutron sensitive space 44.

The materials of construction for the metallic elements of this device are preferably corrosion resistant low atomic weight materials having low neutron absorption cross sections in order to minimize neutron activation of the materials and attenuation of the radiation to be measured. Aluminum and its light weight alloys including alloying ingredients of low neutron absorption cross section are suitable.

Referring more particularly to FIGURE 2, an end view of the device of FIGURE 1 is shown which illustrates the circular cross section of case 10 and the placement of terminals 90, 92, and 94 on first end member 12. Referring again briefly to FIGURE 1, the internal structure of terminal 92 is shown. Terminal 92 is a tubular element secured to first end member 12. It contains insulated seal penetration elements 110, 112, and 114, element 114 being the insulating part and element 110 being the conductive parts of the seal. Lead 98 is welded at 116 to the central conductor 118 of connector 120 provided with insulator 122 and adapted to accept an AN type coaxial cable connector. Of course alternate sealed terminal connections may be substituted.

Referring now to FIGURE 3, a detailed cross section view is shown of terminal 94, which is a tubular element secured to first end member 12. In this figure, elements which also appear in FIGURE 1 are designated by the same numbers. As will be seen, lead 100 is secured at its upper end 130 to the wall of evacuation tube 102 which is pinched off and sealed at 104 and welded shut at 132 during manufacture. Lead 100 is provided with insulating sleeve 134 which penetrates first annular boss 48 as well as first circular insulator 52 and is electrically connected at 136 to first end ring 28 of the signal electrode. Terminal 94 contains insulated seal penetration elements 138, 140, and 142. Element 140 is the insulator part and element 138 is the conductor. Evacuation tube 102 extends from seal element 138. Lead 100 is connected through tube 102 and through weld 132 to central conductor 144 of connector 145 provided with insulator 146 and adapted to receive an AN type coaxial cable connector. Terminal 94 is provided with an insulating liner 148 to secure seal penetration element 138.

Referring now to FIGURE 4, a detailed cross section is shown of terminal 90, which also is a tubular element secured to first end member 12. Again, elements also shown in FIGURE 1 are designated with the same numerals. Lead 96 passes centrally down through the internal opening of terminal 90 and passes through opening 150 in retaining plate 46 and first annular boss 48, turns just above first circular insulator 54, and contacts inner high voltage electrode 20 at 152. Terminal 90 includes insulated seal penetration elements 154, 156, and 158, element 156 being the insulator part and 154 being the conductive element. Lead 96 extends through the seal penetration and is welded at 158 to central conductor 160 of connector 162 provided with insulator 164, and adapted to receive an AN type coaxial cable connector.

Referring now to FIGURE 5, a simplified schematic diagram of a circuit in which the device of the present invention may be used is shown. The compensated ion chamber is indicated schematically at 170. It includes high voltage electrode 172 connected to the negative terminal 174 of a power supply not shown, high voltage electrode 176 connected to the positive terminal 178 of the power supply, and an intermediate signal electrode 180. A neutron sensitive material, such as any of those noted herein, is disposed in layers 182 and 184 on electrodes 176 and 180, respectively. A gamma sensitive volume 186 is thus connected in series opposition with neutron and gamma sensitive volume 188.

In FIGURE 5 the compensated ion chamber is connected to a D.C. amplifier of the cathode follower type, and including vacuum tube 190. Signal electrode 180 is connected to control grid 192 which is also provided with grid bias resistor 194. Cathode 196 is provided with cathode bias resistor 198 and is also connected by lead 200 to the safety circuit of a nuclear reactor, for example. A voltage divider consisting of series resistors 202 and 204, suitably selected to provide an approximate 10 millivolt input signal for recorder 206 is provided. Anode 208 of vacuum tube 190 is connected to the positive terminal 210 of an amplifier power supply not shown.

In operation, the compensated ion chamber 170 when irradiated passes a current and provides a signal voltage to control grid 192. For a grid bias resistor on the order of 3.3 megohms, a 10 microampere ion chamber signal produces a signal of approximately 33 volts on control grid 192. In this D.C. amplifier this is sufficient to provide a cathode output voltage on the order of 30 volts. Thus, to provide the 10 millivolts for recorder 206, the ratio of resistors 202 and 204 is on the order of 3,000.

Figure 6:
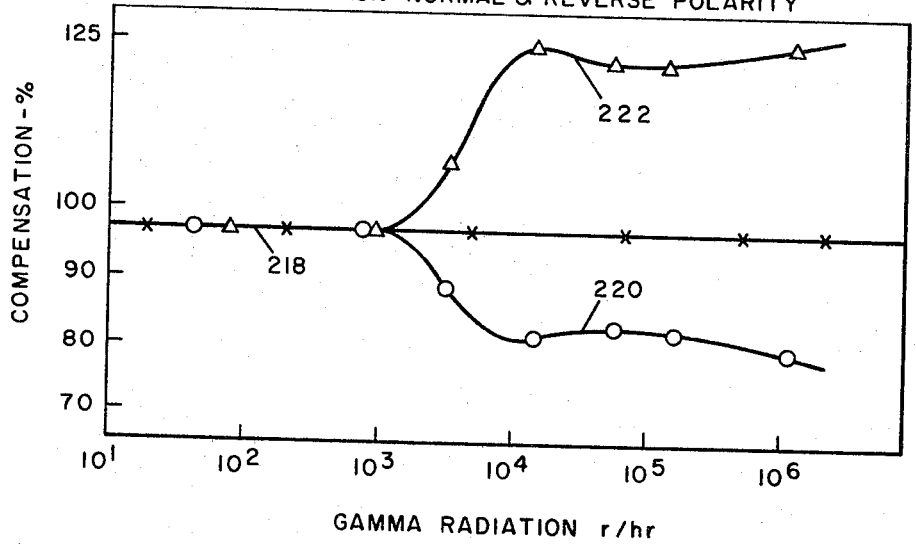
FIGURE 6 is a graphical illustration of test data showing the improved gamma compensation of the chambers embodying this invention relative to the compensation characteristics of prior art chambers.

Referring finally to FIGURE 6, a graphical representation of test data is shown comparing the variation in gamma compensation as a function of gamma radiation level for a prior art compensated ion chamber and for the compensated ion chamber according to this invention. The percent of gamma compensation is defined as the ratio of the actual output current produced in the gamma sensitive volume (42 in FIGURE 1, 186 in FIGURE 5), divided by the corresponding current produced in the neutron and gamma sensitive volume (44 in FIGURE 1, 188 in FIGURE 5), multiplied by one hundred. The neutron chamber embodying this invention was substantially as shown and described in connection with FIGURES 1 through 4. The prior art chamber had a structure similar in general to that shown in FIGURES 1 through 4, except that the signal electrode 22 was not supported with the first and second circular insulators 52 and 62, but utilized at each end three cylindrical pillar-type insulators spaced 120 degrees apart around the periphery of the signal electrode. These devices were examined with normal and reverse polarity in a neutron field having a variable gamma component, and the data shown in FIGURE 6 were obtained.

With normal polarity applied to the prior art device (that is, with the central electrode negative and the outer electrode positive), the degree of compensation broke sharply from a constant value near 100% (actually 96.8%)[1] at a gamma radiation level of $8.6 \times 10^2$ r./hr. to 80.5% at a gamma radiation level of $1.4 \times 10^4$ r./hr. Throughout the range of gamma radiation levels of

---

[1] Shown by linear region 218.

$10^4$ to about $10^6$ r./hr., the gamma compensation was somewhat variable in the 80 to 83% range. This is shown in lower curve portion 220. With reversed polarity, the compensation broke from 96.8% at 8.6 x $10^2$ r./hr. and rose sharply to an undesirable and variable level of about 120 to 125% throughout this same gamma radiation level range, as shown by upper curve portion 222. The compensated ion chamber of the present invention however retained its compensation at approximately 97% compensation in spite of the variation in gamma radiation level through the range of 10 to about $10^6$ r./hr., and irrespective of the polarity of the applied high voltage.

EXAMPLE

An improved gamma compensated neutron ion chamber embodying the present invention was constructed having the following principal dimensions. The metallic parts were fabricated from Type 2S or Type 1100 aluminum, and the insulating elements were fused alumina.

Length: Inches
- Overall (including terminals) _____ 12.70
- Body portion _____ 10.55

Case 10:
- Outside radius _____ 1.505
- Thickness _____ 0.0625
- Inside radius _____ 1.4425
- Length _____ 10.15

Outer h.v. electrode 36:
- Outside radius _____ 1.150
- Thickness _____ 0.031
- Length _____ 8.75
- Coating inside, 96% $B^{10}$.

Signal electrode 22—
- Outer tube 26:
  - Outside radius _____ 1.00
  - Thickness _____ 0.031
  - Inside radius _____ 0.969
  - Length _____ 7.89
  - Coating outside, 96% $B^{10}$.
- Inner tube 24:
  - Outside radius _____ 0.560
  - Thickness _____ 0.031
  - Inside radius _____ 0.529
  - Length _____ 7.89
- End rings 28 and 30:
  - Outer radius _____ 1.00
  - Radial thickness _____ 0.481
  - Inner radius _____ 0.529
  - Length _____ 0.270
- Annular grooves 32 and 34:
  - Outside radius _____ 0.870
  - Radial thickness _____ 0.255
  - Inside radius _____ 0.615
  - Depth _____ 0.135

Inner h.v. electrode 20:
- Diameter _____ 0.250
- Length, with insulators _____ 0.60

Circular insulator 52:
- Outside radius _____ 1.00
- Radial thickness _____ 0.471
- Inside radius _____ 0.529
- Longitudinal thickness _____ 0.115
- Annular projections 54 and 56:
  - Outside radius _____ 0.860
  - Radial thickness _____ 0.190
  - Inside radius _____ 0.670
  - Length _____ 0.195
- Conductive coating, evaporated platinum.

Circular insulator 62:
- Outside radius _____ 1.00
- Radial thickness _____ 0.471
- Inside radius _____ 0.529
- Longitudinal thickness _____ 0.115
- Annular projection 76:
  - Outside radius _____ 0.860
  - Radial thickness _____ 0.190
  - Inside radius _____ 0.670
  - Length _____ 0.195
- Annular projection 66—
  - Base:
    - Outside radius _____ 0.920
    - Radial thickness _____ 0.325
    - Inside radius _____ 0.595
  - End:
    - Outside radius _____ 0.890
    - Radial thickness _____ 0.240
    - Inside radius _____ 0.650
  - Length _____ 0.290
- Conductive coating, evaporated platinum.

The neutron sensitive material, boron in this case, is deposited in an amount to give a layer containing 1 mg./cm.$^2$.

A particular embodiment of this invention has been described in considerable detail by way of illustration. It should be understood that various modifications and adaptations thereof may be made by those skilled in this particular art without departing from the spirit and scope of this invention as set forth in the following claims forming a part of this specification.

I claim:

1. A gamma compensated neutron sensitive ion chamber which comprises a case, a first end member closing one end of said case and providing a first inwardly projecting boss, a second end member closing the other end of said case and providing a second inwardly projecting boss, an inner electrode, a signal electrode surrounding said inner electrode, an outer electrode surrounding said signal electrode, said electrodes being coaxially spaced apart from one another within said case, a first insulator projecting into supporting contact with said first boss and with one end of said signal electrode, a second insulator projecting into supporting contact with the other end of said signal electrode and said second boss, the corresponding inner and outer dimensions and the thicknesses of said first boss, said first and second insulators and said signal electrode being substantially the same, readily ionizable medium filling all open volumes within said case, a neutron sensitive material disposed between said signal and said outer electrodes and capable of producing ionizing radiation upon neutron irradiation, and terminal means secured to and insulated from said case and connected to said electrodes.

2. A gamma compensated neutron sensitive ion chamber which comprises a case, a first end member closing one end of said case and providing a first inwardly projecting boss, a second end member closing the other end of said case and providing a second inwardly projecting boss, an inner electrode, a signal electrode surrounding said inner electrode, an outer electrode surrounding said signal electrode, said electrodes being coaxially spaced apart from one another within said case, a first signal electrode insulator projecting into supporting contact with said first boss and with one end of said signal electrode, a second signal electrode insulator projecting into supporting contact with the other end of said signal electrode and said second boss, the corresponding inner and outer dimensions and the thicknesses of said first boss, said first and second signal electrode insulators and said signal electrode being substantially the same, a readily ionizable medium filling all open volumes within said case, a neutron sensitive material disposed between said signal and said outer electrodes and capable of producing ionizing radiation upon neutron irradiation, and terminal means secured to and insulated from said case and connected to said electrodes.

3. A gamma compensated neutron sensitive ion chamber which comprises a case, a first end member closing one end of said case and providing a first inwardly projecting boss, a second end member closing the other end of said case and providing a second inwardly projecting boss, an inner electrode insulated from and supported by and between said bosses, a signal electrode surrounding said inner electrode, an outer electrode surrounding said signal electrode and insulated from and supported by said case, said electrodes being coaxially spaced apart from one another within said case, a first signal electrode insulator projecting into supporting contact with said first boss and with one end of said signal electrode, a second signal electrode insulator projecting into supporting contact with the other end of said signal electrode and said second boss, the corresponding inner and outer dimensions and the thicknesses of said first boss, said first and second signal electrode insulators and said signal electrode being substantially the same, a readily ionizable medium filling all open volumes within said case, a neutron sensitive material disposed between said signal and said outer electrodes and capable of producing ionizing radiation upon neutron irradiation, and terminal means secured to and inspulated from said case and connected to said electrodes.

4. A gamma compensated neutron sensitive ion chamber which comprises a cylindrical case, a first end member closing one end of said case and providing a first inwardly projecting annular boss, a second end member closing the other end of said case and providing a second inwardly projecting annular boss, an inner electrode insulated from and supported by and between said first and second annular bosses, a signal electrode surrounding said inner electrode, an outer electrode surrounding said signal electrode and insulated from and supported by said case, said electrodes being coaxially spaced apart from one another within said case, a first circular signal electrode insulator projecting into supporting contact with said first annular boss and with one end of said signal electrode, a second circular signal electrode insulator projecting into supporting contact with the other end of said signal electrode and said second annular boss, the corresponding inner and outer diameters and radial thicknesses of said first annular boss, said first and second circular signal electrode insulators and said signal electrode being substantially the same, readily ionizable medium filling all open volumes within said case and between said electrodes, a neutron sensitive material disposed between said signal and said outer electrodes and capable of producing ionizing radiation upon neutron irradiation, and terminal means secured to and insulated from said case and connected to said electrodes.

5. A gamma compensated neutron sensitive ion chamber which comprises a cylindrical case, a first end member closing one end of said case, a retainer plate disposed therein adjacent said first end member and having a first inwardly projecting annular boss, a second end member closing the other end of said case and providing a second inwardly projecting annular boss, said first annular boss having an annular groove in its inner face, an inner high voltage electrode insulated from and coaxially supported by and between said first and second annular bosses, a signal electrode surrounding said inner electrode, said signal electrode being provided with an annular slot in each of its end surfaces, an outer high voltage electrode surrounding said signal electrode and insulated from and supported by said case, said electrodes being coaxially spaced apart from one another within said case, a first circular signal electrode insulator provided with a first and a second annular projections extending respectively into the annular slots provided in said first boss and in one end of said signal electrode, a second circular signal electrode insulator provided with a first and a second annular projection extending respectively into the annular slot provided in the other end of said signal electrode and into supporting contact with said second annular boss, the corresponding inner and outer diameters and radial thicknesses of said first annular boss, said first and second circular signal electrode insulators and said signal electrode being substantially the same, an ionizable gas filling all open volumes within said case, a layer of neutron sensitive material disposed on the adjacent surfaces of said signal and said outer electrode and capable of producing ionizing radiation up on neutron irradiation, and terminal means secured to and insulated from said case and connected to said electrodes.

No references cited.

DAVID J. GALVIN, *Primary Examiner.*